US012677756B2

(12) United States Patent
Suarez

(10) Patent No.: US 12,677,756 B2
(45) **Date of Patent: *Jul. 14, 2026**

(54) PLANT HOLDER WITH INTEGRATED LIGHTING FIXTURE AND AESTHETIC FEATURES

(71) Applicant: Silvino Michael Suarez, Los Lunas, NM (US)

(72) Inventor: Silvino Michael Suarez, Los Lunas, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/086,959

(22) Filed: Mar. 21, 2025

(65) Prior Publication Data

US 2025/0212735 A1      Jul. 3, 2025

Related U.S. Application Data

(60) Division of application No. 17/719,128, filed on Apr. 12, 2022, now Pat. No. 12,268,134, which is a continuation-in-part of application No. 17/550,237, filed on Dec. 14, 2021, now Pat. No. 12,518,660.

(60) Provisional application No. 63/178,729, filed on Apr. 23, 2021, provisional application No. 63/128,666, filed on Dec. 21, 2020.

(51) Int. Cl.
*A01G 9/02*          (2018.01)
*A01G 9/24*          (2006.01)
(52) U.S. Cl.
CPC .............. *A01G 9/02* (2013.01); *A01G 9/249* (2019.05)

(58) Field of Classification Search
CPC ................................. A01G 9/02; A01G 9/249
See application file for complete search history.

(56) References Cited

U.S. PATENT DOCUMENTS

| | | | | |
|---|---|---|---|---|
| 5,741,061 | A * | 4/1998 | Lehmann ............ | F21V 33/0028 |
| | | | | 362/805 |
| 8,974,071 | B2 * | 3/2015 | Sanford, Jr. ............. | A01G 9/02 |
| | | | | 362/805 |
| 10,709,072 | B2 * | 7/2020 | Ryan ........................ | A01G 9/02 |
| 2009/0034244 | A1 * | 2/2009 | Tabarelli De Fatis ... | A01G 9/02 |
| | | | | 362/154 |
| 2010/0141156 | A1 * | 6/2010 | Canino ............... | F21V 33/0028 |
| | | | | 315/313 |
| 2018/0275330 | A1 * | 9/2018 | McRae ............... | F21V 33/0028 |

FOREIGN PATENT DOCUMENTS

| | | | | |
|---|---|---|---|---|
| CN | 104322305 | A * | 2/2015 | ........... A01G 27/003 |

* cited by examiner

*Primary Examiner* — Joshua D Huson
*Assistant Examiner* — Alanna K Peterson
(74) *Attorney, Agent, or Firm* — HAYES SOLOWAY P.C.

(57) ABSTRACT

A plant holder with integrated lighting fixture and aesthetic features is provided. In one example, the apparatus has a least one portable container capable of holding a plant. A lighting device is integrated into at least a portion of the portable container, wherein the lighting device is capable of illuminating a central region above the portable container. A power supply is connected to the lighting device.

14 Claims, 5 Drawing Sheets

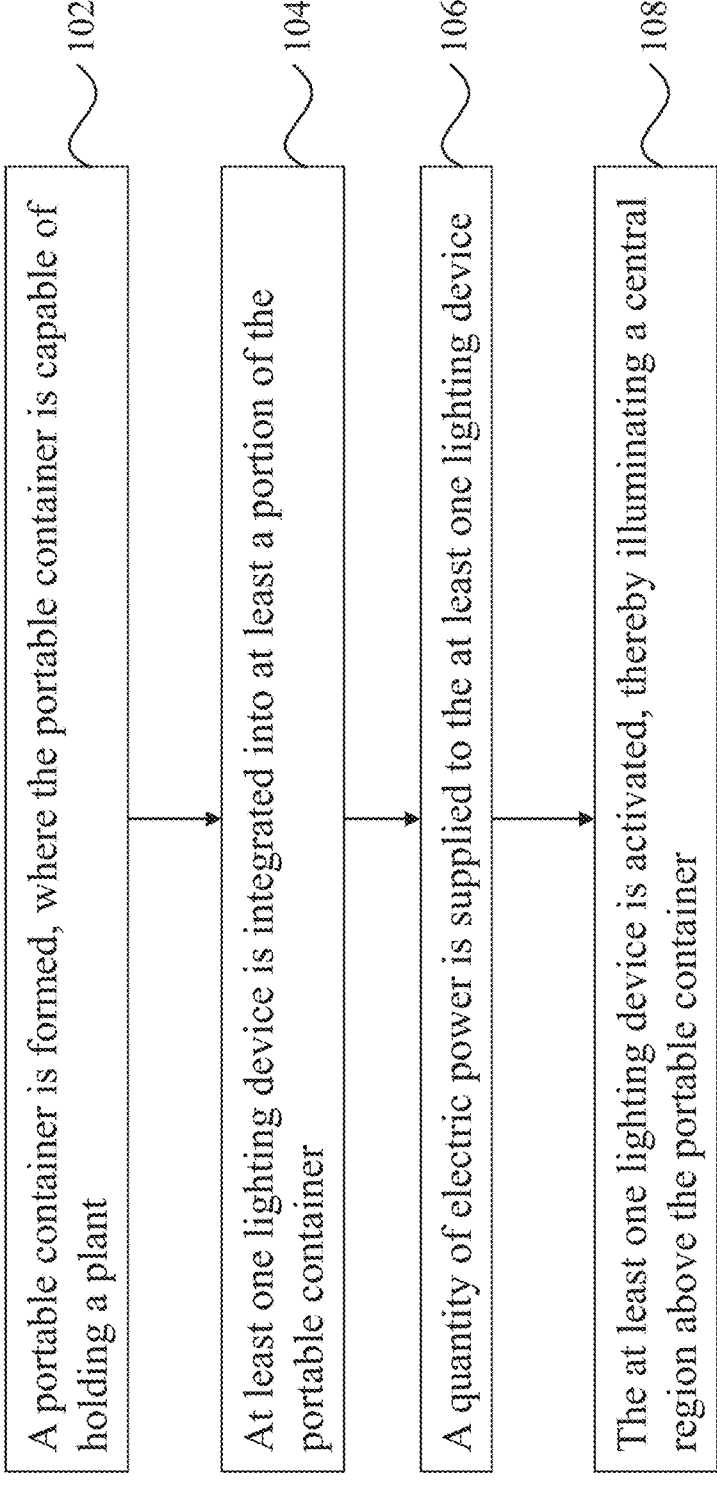

100

A portable container is formed, where the portable container is capable of holding a plant — 102

At least one lighting device is integrated into at least a portion of the portable container — 104

A quantity of electric power is supplied to the at least one lighting device — 106

The at least one lighting device is activated, thereby illuminating a central region above the portable container — 108

FIG. 5

PLANT HOLDER WITH INTEGRATED LIGHTING FIXTURE AND AESTHETIC FEATURES

CROSS REFERENCE TO RELATED APPLICATION

The subject application is a divisional application of U.S. patent application Ser. No. 17/719,128 entitled, "Plant Holder With Integrated Lighting Fixture And Aesthetic Features" filed Apr. 12, 2022, which claims benefit of U.S. Provisional Application Ser. No. 63/178,729 entitled, "Plant Holder Apparatus with Integrated Lighting and Aesthetic Features" filed Apr. 23, 2021, and is a continuation in part application of U.S. patent application Ser. No. 17/550,237 entitled, "Concrete Structure with Embedded Aesthetic Features" which claims benefit of U.S. Provisional Application Ser. No. 63/128,666 entitled, "Concrete Structure with Embedded Aesthetic Features" filed Dec. 21, 2020, the entire disclosures of which are incorporated herein by reference.

FIELD OF THE DISCLOSURE

The present disclosure is generally related to plant holders and more particularly is related to a plant holder apparatus with integrated lighting fixture and aesthetic features.

BACKGROUND OF THE DISCLOSURE

Plants, flowers, and other agricultural products are often used to increase the appearance of homes, business, public facilities, and other settings. In many situations, lights are often utilized to illuminate gardens or pathways. It is also common to use outdoor landscape lighting to specifically illuminate a particular plant or tree which is to be highlighted due to it having a particularly pleasing appearance.

The lights used in these situations are typically referred to as landscape lighting, and they often include a stand-alone lighting fixture which is weather-resistant, or a group of weather-resistant lighting fixtures which are connected together and powered collectively. These types of landscape lighting fixtures often operate on a low voltage power supply with power cords buried out of sight underground, such that the fixture itself and the lighting components are not prominent in appearance and do not detract from the landscaping they are illuminating. Due to the need to bury power cords underground, it can be difficult and inefficient to install this type of lighting because it often involves trenching in the ground between the location where the landscape lighting fixture is to be positioned and a power supply. Additionally, it is also tedious to move the location of landscape lighting fixtures after they are installed since doing so usually requires digging new trenches for the power cords.

Thus, a heretofore unaddressed need exists in the industry to address the aforementioned deficiencies and inadequacies.

SUMMARY OF THE DISCLOSURE

Embodiments of the present disclosure provide an apparatus, a system, and a method for a plant holder apparatus with integrated lighting fixture. Briefly described, in architecture, one embodiment of the apparatus, among others, can be implemented as follows. A plant holder apparatus with integrated lighting fixture has a least one portable container capable of holding a plant. A lighting device is integrated into at least a portion of the portable container, wherein the lighting device is capable of illuminating a central region above the portable container. A power supply is connected to the lighting device.

The present disclosure can also be viewed as providing a cast concrete plant holder apparatus with integrated lighting fixture. Briefly described, in architecture, one embodiment of the apparatus, among others, can be implemented as follows. A portable container is formed from a cast concrete material, the portable container having an interior space capable of holding a plant within a quantity of potting medium. At least one lighting device is integrated into a sidewall of the portable container, where the at least one lighting device directs a quantity of light upwards towards a central region above the portable container, thereby illuminating a plant positionable within the portable container. A power supply is connected to the at least one lighting device.

The present disclosure can also be viewed as providing a method of manufacturing a plant holder apparatus with integrated lighting fixture. In this regard, one embodiment of such a method, among others, can be broadly summarized by the following steps: forming a portable container capable of holding a plant; integrating at least one lighting device into at least a portion of the portable container; supplying a quantity of electric power to the at least one lighting device; and activating the at least one lighting device, thereby illuminating a central region above the portable container.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 5 is a flowchart illustrating a method of manufacturing a plant holder apparatus with integrated lighting fixture, in accordance with exemplary embodiments of the disclosure.

DETAILED DESCRIPTION

Figure 1:
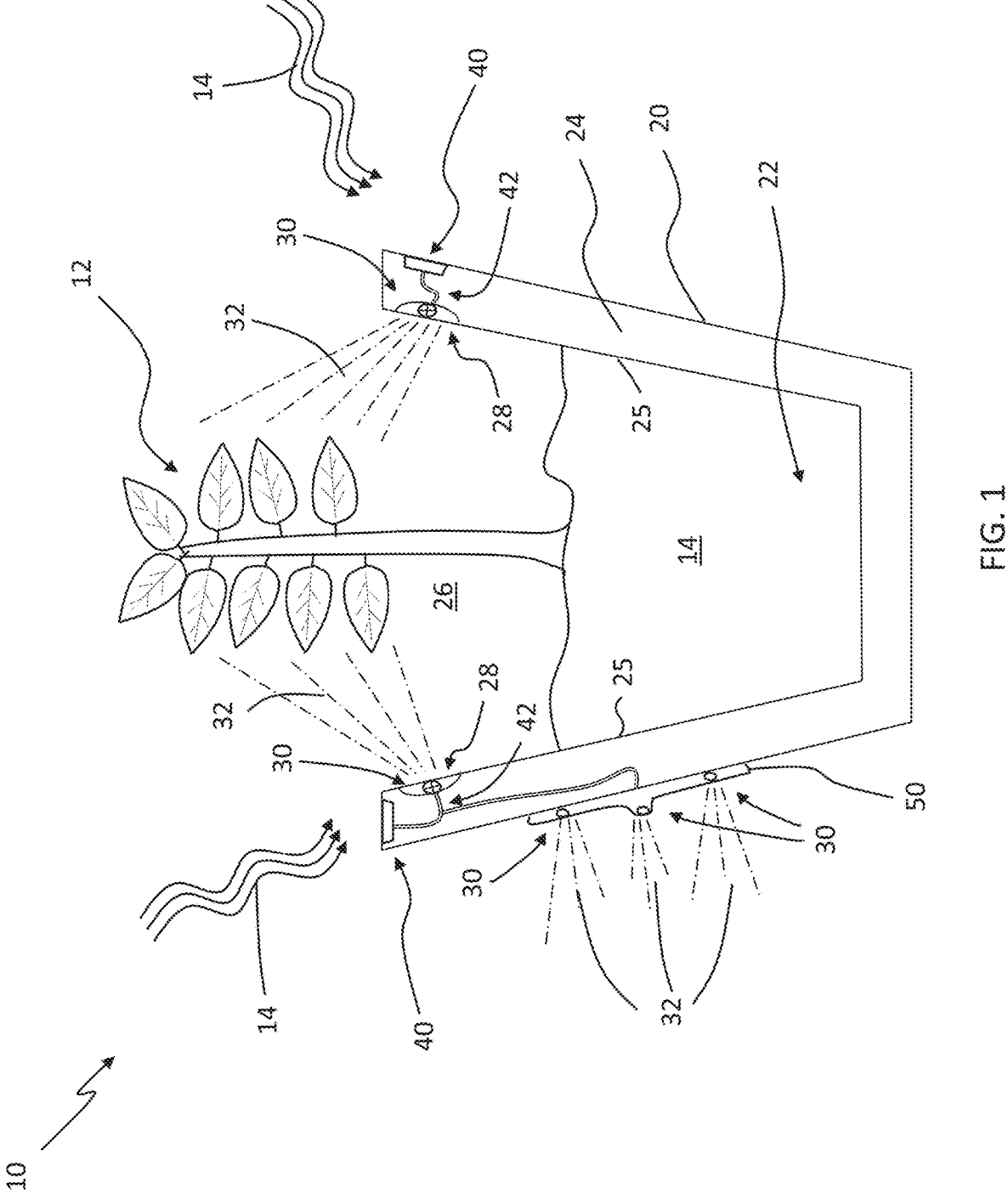
FIG. 1 is a cross-sectional diagrammatical illustration of a plant holder apparatus with integrated lighting fixture, in accordance with exemplary embodiments of the present disclosure.

To improve upon the shortcomings as described in the Background, the subject disclosure is directed to a plant holder apparatus with integrated lighting fixture 10 which can be used to individually illuminate the central region above the portable container holding a plant. FIG. 1 is a cross-sectional diagrammatical illustration of a plant holder apparatus with integrated lighting fixture 10, in accordance with exemplary embodiments of the present disclosure. The plant holder apparatus with integrated lighting fixture 10, which may be referred to simply as 'apparatus 10' includes a least one portable container 20 capable of holding a plant 12. The container 20 may be a container or vessel used to hold any type of plant 12 or similar agriculture product. As shown, the container 20 may be a flowerpot or similarly-fashioned container which has an interior volume 22 which can receive the plant 12 and any soil 14 or potting medium which may be used to support the plant 12 or a root structure thereof. The container 20 may include one or more sidewalls 24 which partially enclose the interior volume 22, whereby an opening 26 at the top of the container 20 remains open. The container 20 may also include other designs with different openings 26 or varying sidewalls 24, such as, for example a container 20 which includes partitioned areas, side-mounted potting area, or similar designs.

The container 20 may be any size or any shape, and it may be made from any type of material. In one preferred example, the container 20 may be constructed from a concrete material or similar composition, where the container 20 is molded in a form. Other materials, such as plastics, woods, or metals may be used to construct the container 20, either in full or in part. In accordance with this disclosure, the container 20 is described as 'portable' to indicate that the portable container 20 can be moved or relocated with relative ease, and as desired by the user. Accordingly, the container 20 may be sized such that it can be carried by a single human, such as when the container 20 is substantially 50 pounds or less, or the container may be larger such that machinery, such as a hand truck or tractor is used to transport the container 20. Additionally, it is noted that the portable container 20 could be another type of container outside of what is commonly used to hold plants, for example, a decorative pot or pottery which holds something other than a plant, such as a sculpture or similar item which is desired to be illuminated for decorative purposes.

As shown in FIG. 1, a lighting device 30 may be integrated into at least a portion of the container 20, such as by mounting or securing the lighting device 30, or a portion thereof, to or within a sidewall 24 of the container 20. The lighting device 30 may include a light bulb or diode, such as a light-emitting diode (LED), which is positioned within a housing, or on a chip in the case of an LED, and which receives electrical power from a power supply 40 to generate a quantity of light 32 which can be directed to the plant 12 within the container 20. It is noted that any type of lighting device 30 may be used, but LED-based lighting devices may be preferred due to their relatively low energy consumption and bright illumination. The LED-based lighting device may include single LED fixtures, arrays of LEDs, LED strips, or similar LED lighting units, all of which are considered within the scope of the present disclosure.

The lighting device 30 may be connected with the power supply 40 through use of a wire 42 which is embedded or otherwise positioned within or on the container 20 or a sidewall 24 thereof. For instance, when the container 20 is formed, such as from concrete, it may be formed with cast tubes through or within the sidewalls 24 which the wires 42 can be later placed, or it can be cast with the wires 42 in place within the concrete sidewall 24 such that they are non-removable from the container 20. In other examples, it may be possible to use induction power to supply electrical power to the lighting device 30, therefore, such that a wire 42 is not needed. Additionally, it is possible for the lighting device 30 to operate without the use of external wires, such as when the lighting device 30 utilizes an integrated battery or similar power source which is positioned substantially at or within the lighting device 30.

The lighting device 30 may be positioned within the sidewall 24 of the container 20 in a location proximate to a top edge or rim of the container 20, e.g., at or near the terminating upper portion of the sidewall 24. In this position, the light 32 provided by the lighting device 30 may be directed upwards towards a central region above the container 20 where a plant 12 growing within the container 20 is positioned. The lighting device 30 may be affixed to the interior surface 25 of the sidewall 24 of the container 20, or as shown in FIG. 1, the lighting device 30 may be positioned within a cavity 28 formed within the interior surface 25 of the sidewall 24. In this position, the interior surface 25 of the cavity 28 can help direct the light 32 towards the plant 12 and the lighting device 30 can remain in a position safely inset from the interior surface 25 of the sidewall 24 from where it might be damaged by a gardening tool used within the container 20. It is noted that the position of the lighting device 30 can be adjusted to another position, such as closer to the rim of the container 20, further down within the container 20, or even along the upper rim edge of the container 20, all of which are considered within the scope of the present disclosure.

The location of the lighting device 30 may be selected based on the intended use of the apparatus 10. For instance, in some situations, it may be desirable to include the lighting device 30 in a position near a top rim of the sidewall 24, whereas in other situations, it may be preferable for the lighting device 30 to be positioned on a horizontal or substantially horizontal top rim surface 27 of the sidewall 24, such as discussed relative to FIG. 4. It may also be possible for the lighting device 30 to be positioned on other locations of the container 20, such as on an exterior surface of the sidewall 24, near a base of the container 20, or elsewhere within the interior 22 of the container 20.

Additionally, as depicted in FIG. 1, it is possible for a plurality of lighting devices 30 to be used instead of a single lighting device 30. For instance, a plurality of lighting devices 30 may be used in various locations on the container 20. For example, in addition to lighting devices 30 directing light 32 interiorly towards the plant 12, it is possible to include lighting devices 30 along an exterior surface of the sidewall 24, such that the light 32 emitted therefrom extends outwards from the container 20. In FIG. 1, these externally-facing lighting devices 30 are depicted as part of an aesthetic feature 50 which is positioned on the container 20. The aesthetic feature may be a decorative structure which can be integrally affixed or formed on the container 20, or it may be a structure which can be applied separately to the container 20. This aesthetic feature 50 may be especially useful for containers 20 formed from concrete, where the aesthetic feature 50 adds a design, a logo, text, or artwork to the container 20. The aesthetic feature 50 may also be a design which is cast directly into the sidewall 24 of the container 20.

One or more power supplies 40 may be used to provide a quantity of electrical power to the lighting devices 30. The power supply 40 may include any type of power supply, such as hard-wired electrical power, electrical power supplied through a plug-in at a receptacle, solar power, or any combination thereof. In FIG. 1, the power supply 40 is depicted as a solar power unit which is integrated into the container 30, such that the apparatus 10 does not need to be plugged in and can be relocated with ease. The solar power unit may include a photovoltaic cell or cells positioned at an exterior surface of the container 20, such that they can receive sunlight 14 to generate an electrical current which can be provided to the lighting device 30 simultaneously, or at a later point in time.

Figure 2:
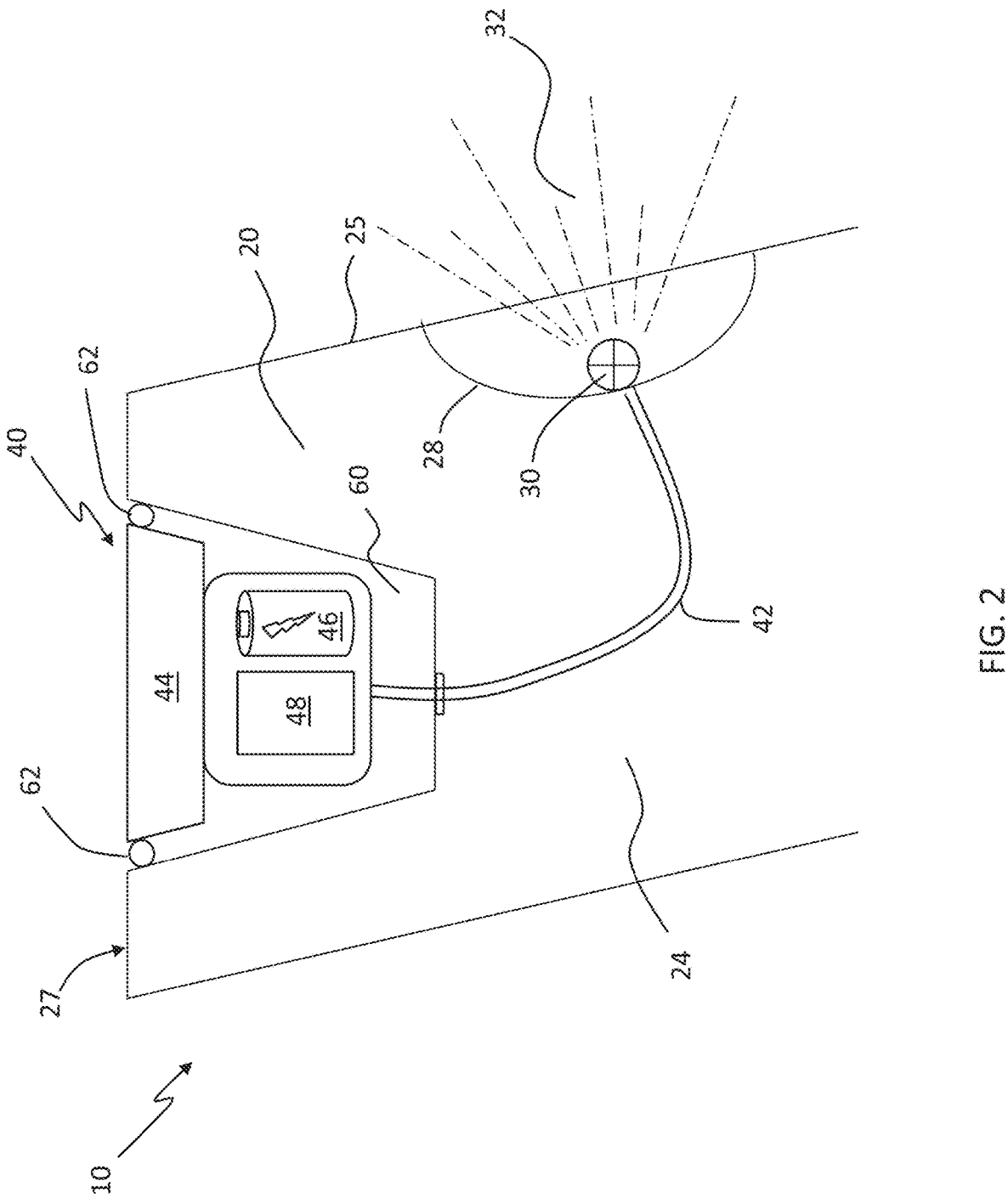
FIG. 2 is a detailed cross-sectional diagrammatical illustration of a portion of the plant holder apparatus with integrated lighting fixture of FIG. 1, in accordance with exemplary embodiments of the present disclosure.

FIG. 2 is a detailed cross-sectional diagrammatical illustration of a portion of the plant holder apparatus 10 with integrated lighting of FIG. 1, in accordance with exemplary embodiments of the present disclosure. In particular, FIG. 2 depicts a detailed image of the top edge portion of the sidewall 24 of the container 20 showing the lighting device 30 and the power supply 40, in accordance with one exemplary embodiment of the present disclosure. The power supply 40, depicted as a solar unit, includes a photovoltaic (PV) panel 44 which is positioned along a top, outer edge of the container 20, such that it can be positioned to face substantially skyward and receive sunlight. The PV panel 44 may be connected to a battery 46 which can store the electrical energy produced by the PV panel 44 during the sunlight hours, whereby the electrical energy is discharged at night or when the lighting is desired. The solar unit may include control circuitry with a light sensor or photo eye 48 which can detect sunlight, thereby controlling the operation of the lighting unit 30 without requiring the user to manually turn the lighting unit 30 on or off. Additional or different components, as commonly used with solar-powered devices, can also be included.

It is further noted that the solar unit power supply 40 can be integrated into the container 20 itself, such as where a channel 60, either a single continuous channel or a plurality of separate channels, is formed in the top rim of the container 20 which is likely to receive the greatest quantity of sunlight. In this example, the channel 60 may have a depth which can receive the power supply 40 components, as shown, with the PV panel 44 positioned along the top edge of the container 20. The power supply 40 components may be formed together as a unitary structure which is weather tight, such that water will not infiltrate the electronics, or it may also be possible to use a water-sealing device, such as a gasket 62 which ensures that water does not gain access to the channel 60. In other examples, the power supply 40 can be affixed to or on the container 20 without positioning it within the sidewall 24 of the container 20 itself, all such designs and possibilities are considered within the scope of the present disclosure.

Figure 3:
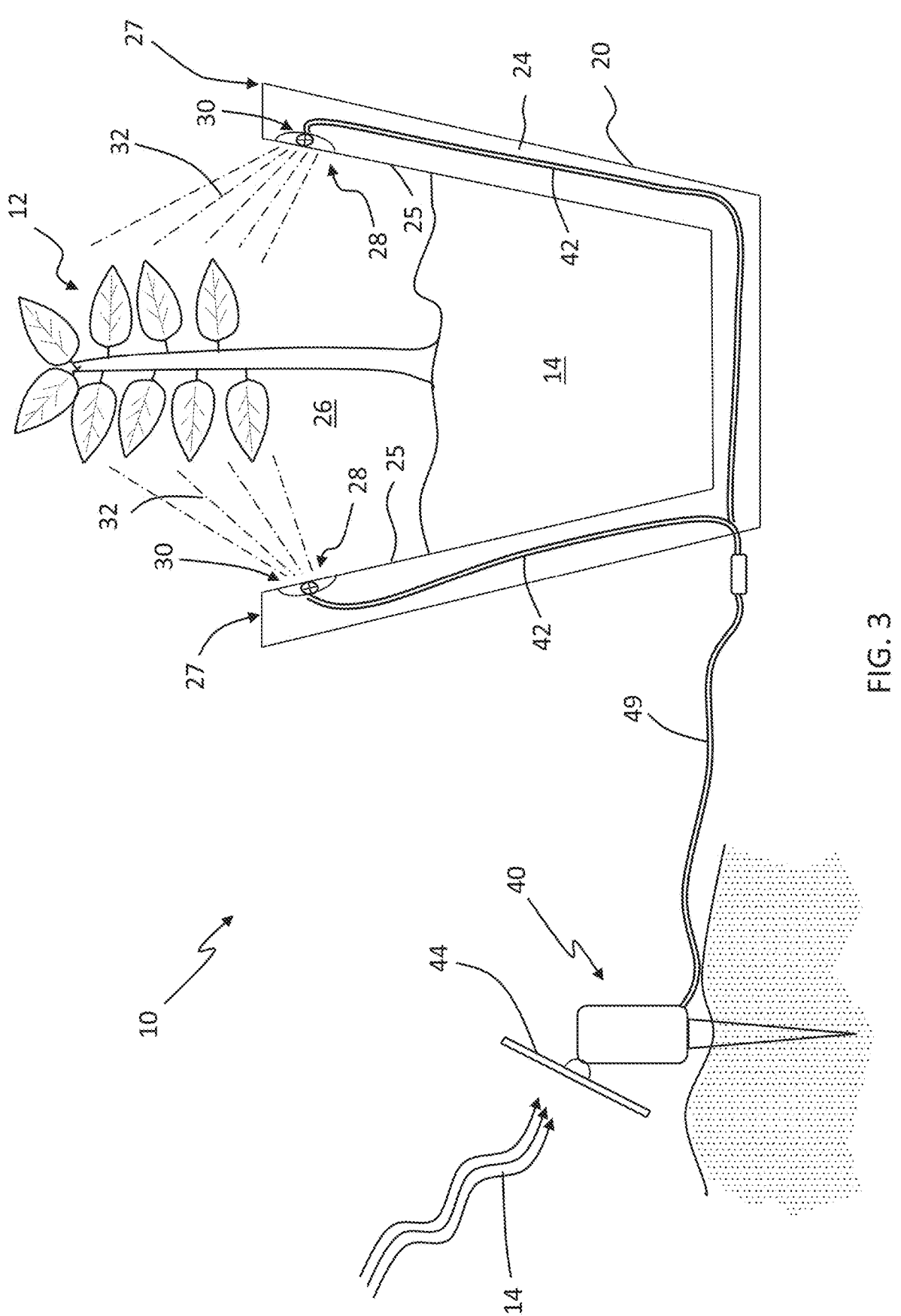
FIG. 3 is a cross-sectional diagrammatical illustration of the plant holder apparatus with integrated lighting fixture, in accordance with exemplary embodiments of the present disclosure.

In another example of the apparatus 10, FIG. 3 is a cross-sectional diagrammatical illustration of the plant holder apparatus with integrated lighting fixture, in accordance with exemplary embodiments of the present disclosure. The apparatus 10 of FIG. 3 is substantially the same as that discussed relative to FIGS. 1-2, all the reference characters of which carry over, with the difference in FIG. 3 being that the power supply 40 is provided as a separate unit which can be positioned remote from the container 20 itself. As shown, the power supply 40 is depicted as a separate unit which is staked in the ground and has a solar unit which has a PV panel 44 to receive sunlight 14. The electrical energy generated by the PV panel 44 may be transmitted through the power supply 40 and through one or more transmission wires 49 which are capable of being connected to the wires 42 internal to the container 20 sidewall 24.

In this design, the separate power supply 40 with the transmission wires 49 allows for the power supply 40 to be positioned remote from the container 20, such that it can be positioned in a location with more sunlight or a location which is less visible to viewers of the plant 12 and container 20. Not only may this increase the aesthetic appearance of the apparatus 10 used in a garden or elsewhere, but it may also help ensure that as the plant 12 grows and gets more foliage, the foliage does not obstruct the sunlight from reaching the PV panel 44. It is further noted that with this design, it may be possible to use a larger power supply 40 for a plurality of containers 20, where the transmission lines 49 are interconnected therebetween and placed just under a groundcover, such as bark mulch or decorative gravel, such that they are not unsightly.

Figure 4:
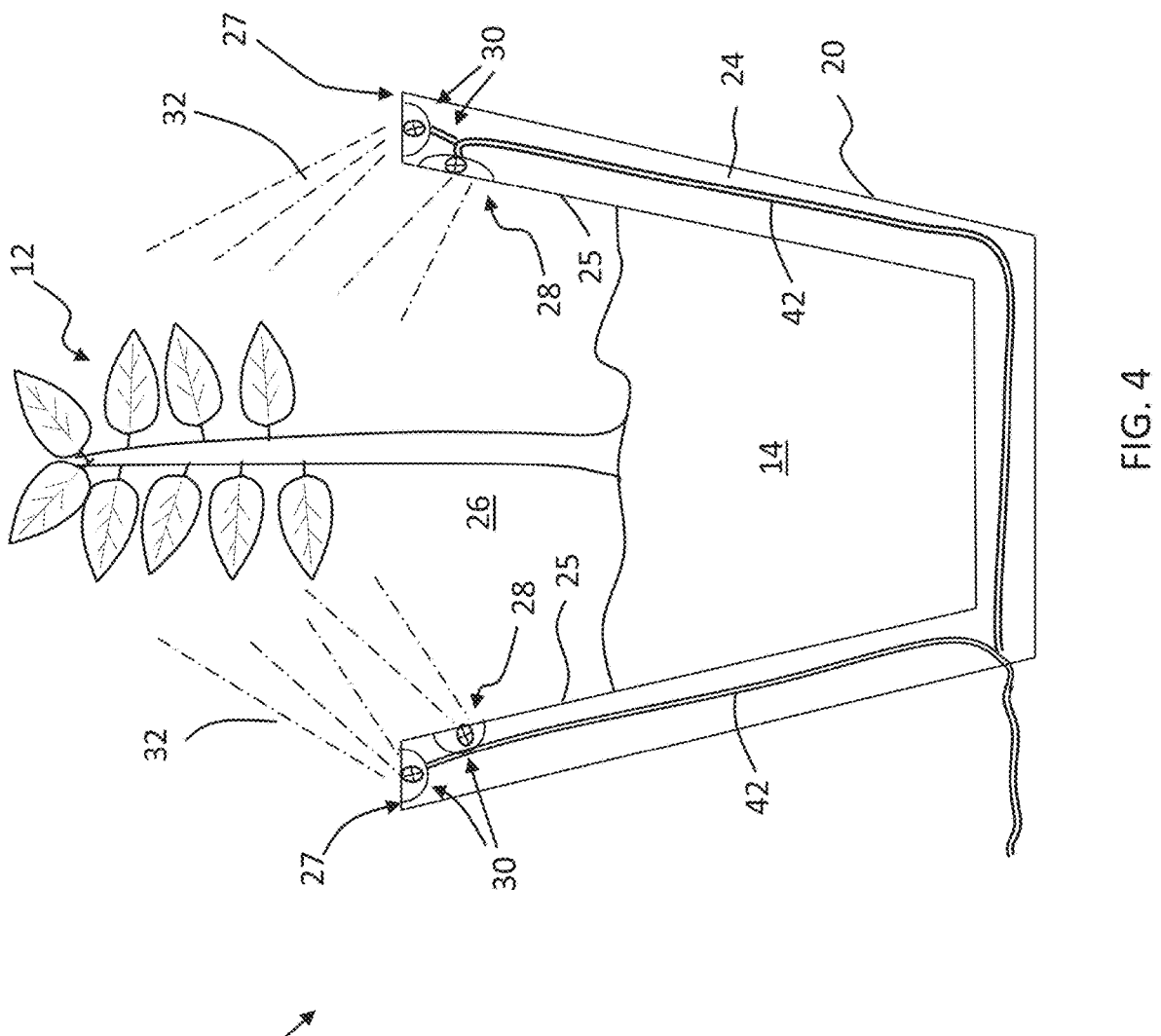
FIG. 4 is a cross-sectional diagrammatical illustration of the plant holder apparatus with integrated lighting fixture, in accordance with exemplary embodiments of the present disclosure.

FIG. 4 is a cross-sectional diagrammatical illustration of the plant holder apparatus 10 with integrated lighting fixture, in accordance with exemplary embodiments of the present disclosure, where FIG. 4 depicts a variation to the apparatus 10 discussed relative to FIGS. 1-3. All reference characters from FIGS. 1-3 carry to FIG. 4. As shown, the lighting device 30 may be positioned on the top surface 27 of the rim of the container 20 such that the light 32 can be directed to upper portions of the plant 12. Additionally, it is also possible for multiple lighting devices 30 to be used on both the sidewall 24 of the container 20 and the top surface 27 of the rim of the container 20. This design may help ensure that the light 32 is directed to both the lower portions of the plant 12 and the upper portions of the plant 12. Any lighting devices 30 used may be wired together and controlled by a single controller and a single power supply, or the lighting devices 30 may be powered and/or controlled separately.

FIG. 5 is a flowchart 100 illustrating a method of manufacturing a plant holder apparatus with integrated lighting fixture, in accordance with exemplary embodiments of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 102, a portable container is formed, where the portable container is capable of holding a plant. At least one lighting device is integrated into at least a portion of the portable container (block 104). A quantity of electric power is supplied to the at least one lighting device (block 106). The at least one lighting device is activated, thereby illuminating a central region above the portable container (block 108). Any number of additional steps, functions, processes, or variants thereof may be included in the method, including any disclosed relative to any other figure of this disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method of manufacturing a plant holder apparatus with integrated lighting fixture, the method comprising:

forming a portable container capable of holding a plant, the container having at least one sidewall enclosing an interior space with an opening at a top of the container, wherein the container, and the at least one sidewall of the container, are formed from a quantity of cast concrete, wherein the at least one sidewall terminates at a rim of the container in a location proximate to the top of the container, and wherein a top rim surface of the sidewall is positioned substantially horizontal;

integrating at least one lighting device into at least a portion of the portable container, wherein the at least one lighting device is capable of illuminating at least one of a central region above the container or an exterior surface of the sidewall of the container;

supplying a quantity of electric power to the at least one lighting device, the power supply having a solar power unit having a photovoltaic (PV) panel capable of generating an electric current from sunlight and a battery capable of storing electrical power generated from the PV panel, wherein the solar power unit is positioned within the sidewall of the container proximate to the rim, and wherein the PV panel is positioned fully recessed in a channel formed in the substantially horizontal top rim surface of the sidewall, the channel being non-intersecting with an interior surface of the sidewall or the exterior surface of the sidewall, wherein a planar face of the PV panel faces vertically outwards, and wherein the planar face is located substantially coplanar with the substantially horizontal top rim surface of the sidewall; and activating the at least one lighting device, thereby illuminating a central region above the container.

2. The method of claim 1, wherein integrating the at least one lighting device into at least the portion of the container further comprises positioning the at least one lighting device on the interior surface of the sidewall of the container.

3. The method of claim 1, wherein the at least one lighting device is positioned within a cavity formed within the interior surface of the sidewall.

4. The method of claim 1, wherein the power supply further comprises at least one wire positioned within the sidewall of the container.

5. The method of claim 1, further comprising directing a quantity of light upwards towards a central region above the container.

6. A method of manufacturing a cast concrete plant holder apparatus with integrated lighting fixture, the method comprising:

forming a container from a quantity of cast concrete, the container having at least one sidewall enclosing an interior space with an opening at a top of the container, wherein the at least one sidewall terminates at a rim of the container in a location proximate to the top of the container, and wherein a top rim surface of the sidewall is positioned substantially horizontal;

integrating at least two lighting devices into the at least one sidewall of the container;

supplying a quantity of electric power to the at least one of the at least two lighting devices, the power supply having a solar power unit having a photovoltaic (PV) panel capable of generating an electric current from sunlight and a battery capable of storing electrical power generated from the PV panel, wherein the solar power unit is positioned within the sidewall of the container proximate to the rim, and wherein the PV panel is positioned fully recessed in a channel formed in the substantially horizontal top rim surface of the sidewall, the channel being non-intersecting with an interior surface of the sidewall or the exterior surface of the sidewall, wherein a planar face of the PV panel faces vertically outwards, wherein the planar face is positioned substantially coplanar with the substantially horizontal top rim surface of the sidewall; and activating the at least one of the at least two lighting devices, thereby:

directing with a first of the at least two lighting devices, a quantity of light upwards towards a central region above the container, thereby illuminating a plant positionable within the container; and directing, with a second of the at least two lighting devices, a quantity of light from the exterior surface of the sidewall of the container.

7. The method of claim 6, wherein integrating the at least two lighting devices into the at least one sidewall of the container further comprises positioning the first of the at least two lighting devices on the interior surface of the sidewall of the container.

8. The method of claim 6, wherein integrating the at least two lighting devices into the at least one sidewall of the container further comprises positioning the first of the at least two lighting devices within a cavity formed within the interior surface of the sidewall.

9. The method of claim 6, wherein integrating the at least two lighting devices into the at least one sidewall of the container further comprises positioning the second of the at least two lighting devices into an aesthetic feature positioned on the exterior surface of the sidewall of the container, wherein the second of the at least two lighting device illuminates the aesthetic feature.

10. The method of claim 9, wherein forming the container from the quantity of cast concrete further comprises casting the aesthetic feature at least partially into the at least one sidewall of the container when the cast concrete is cast.

11. The method of claim 9, wherein the aesthetic feature is applied separately to the exterior surface of the sidewall of the container after the cast concrete is cast.

12. The method of claim 6, wherein the at least two lighting devices are integrated into an aesthetic feature positioned on the exterior surface of the sidewall of the container, wherein the second of the at least two lighting devices illuminates the aesthetic feature.

13. The method of claim 12, wherein the aesthetic feature is cast at least partially into the at least one sidewall of the container when the cast concrete is cast.

14. The method of claim 12, wherein the aesthetic feature is applied separately to the exterior surface of the sidewall of the container after the cast concrete is cast.

* * * * *